(12) United States Patent
Burt

(10) Patent No.: US 8,406,405 B2
(45) Date of Patent: *Mar. 26, 2013

(54) TELECONFERENCING SYSTEM FOR ALLOWING ONE TOUCH TRANSFER FROM A FACILITATOR LED DISCUSSION

(76) Inventor: Brian D Burt, Oakland, CA (US)

(*) Notice: Subject to any disclaimer, the term of this patent is extended or adjusted under 35 U.S.C. 154(b) by 169 days.

This patent is subject to a terminal disclaimer.

(21) Appl. No.: 13/064,849

(22) Filed: Apr. 21, 2011

(65) Prior Publication Data

US 2011/0261944 A1    Oct. 27, 2011

Related U.S. Application Data

(60) Provisional application No. 61/343,113, filed on Apr. 22, 2010.

(51) Int. Cl.
*H04M 3/42* (2006.01)
(52) U.S. Cl. ............... 379/202.01; 379/158; 379/212.01
(58) Field of Classification Search .................. 370/260, 370/261; 379/158, 202.01, 203.01, 212.01; 455/466
See application file for complete search history.

(56) References Cited

U.S. PATENT DOCUMENTS

| 6,404,873 B1* | 6/2002 | Beyda et al. ............. 379/202.01 |
| 7,317,791 B2* | 1/2008 | Carlson ................... 379/202.01 |
| 8,144,855 B2* | 3/2012 | Jaiswal et al. ........... 379/202.01 |
| 2005/0041580 A1* | 2/2005 | Petrovykh ..................... 370/229 |
| 2011/0261939 A1* | 10/2011 | Burt .............................. 379/158 |

* cited by examiner

*Primary Examiner* — Ahmad Matar
*Assistant Examiner* — Oleg Asanbayev

(57) ABSTRACT

A teleconferencing system that enables facilitator-led teleconferences in which a caller can transfer their call to a different conference group, facilitator, or another party by initiating a transfer command, such as by pushing a particular key on their telephone keypad. Application software controls a switch that automatically transfers a caller to a different conference group, facilitator, or party when a transfer-initiating act, such as pressing a key on a keypad, is sensed. The transfer is reported to the current facilitator and to the new facilitator, if any, who is provided with contact information regarding the transferring-in caller.

8 Claims, 2 Drawing Sheets

TELECONFERENCING SYSTEM FOR ALLOWING ONE TOUCH TRANSFER FROM A FACILITATOR LED DISCUSSION

CROSS-REFERENCE TO RELATED APPLICATIONS

This application claims the benefits of the following U.S. Provisional Applications: "Teleconferencing system for allowing one touch transfer from a facilitator led discussion, Provisional Application No. 61/343,113, filed Apr. 22, 2010; "Teleconferencing system for allowing interchange between facilitator led discussions and reporting information about selected callers, Provisional Application No. 61/343,112, filed Apr. 22, 2010; "Teleconferencing system for allowing one touch queuing by callers in a facilitator led discussion," Provisional Application No. 61/343,108, filed Apr. 22, 2010; "Teleconferencing system for allowing large numbers of callers by transferring callers to connected servers in a call bridge," Provisional Application No. 61/343,107, filed Apr. 22, 2010; "Teleconferencing system for allowing the breaking out of groups of callers into sub-teleconferences and the reporting of callers speaking in the sub-teleconferences," Provisional Application No. 61/343,106, filed Apr. 22, 2010; "Teleconferencing system for allowing interchange in facilitator led discussions and sending information to callers electing to receive the information," Provisional Application No. 61/343,105, filed Apr. 22, 2010; "Teleconferencing system for allowing interchange between facilitator led discussions in a main conference and breaking out groups into sub-conferences," Provisional Application No. 61/343,104, filed Apr. 22, 2010.

FIELD OF THE INVENTION

The presently disclosed subject matter is directed towards a facilitator led teleconferencing system that enables a caller to transfer out of a teleconference at the touch of a button or the click of a mouse.

BACKGROUND OF THE INVENTION

A very common way to hold a meeting and to perform group activities with widely dispersed people is teleconferencing. Teleconferencing is highly useful because it allows callers from around the world to participate in the same meeting at low cost.

Teleconferencing has been so successful that user needs have resulted in the development of modern teleconferencing "bridge systems" that allow callers to either dial into or log onto a computerized system that establishes a virtual teleconference. In such systems callers usually have to identify themselves, their access rights are checked, a facilitator is established, and operating rules are set and enforced by the bridge system.

Teleconferencing and the newer bridge systems generally support modern trends in education, business, and other group activities which focus on increasing the number and quality of interactions. For example, modern trends in education lean away from strictly lecture driven modalities and focus more on greater individual participation. In practice teleconferencing participants are often looked at as resources of an organization and as such the desire to incorporate those participants in decision-making at all levels has increased. This becomes a major problem as the geographic diversity of organizations and their participant's increases and as the need for better communications, such as teleconferencing, becomes even more critical. In fact, modern trends have placed such additional burdens on teleconferencing systems that even the newer "bridge teleconferencing systems" are often deemed insufficient.

The result of the foregoing is that more and more programs, be they sales, educational, marketing, or simply group meetings are being delivered and conducted via teleconferencing systems. Teleconferencing reduces costs, makes more efficient use of time, and makes a given meeting available to a greater segment of the population, including home or bedridden individuals.

While generally successful, teleconferences have numerous, well-known limitations. Those limitations are a result of, or are acerbated by, the fact that the normal visual cues available with in-person meetings are often not available in a teleconference. For example, it is not possible for a caller to signal that he or she is leaving the conference or to do so without disrupting the conference. For example, assume that a facilitator leads a teleconference being attended by a large number of callers, but that one caller wishes to leave the conference and transfer to another party. Prior art teleconferencing systems provided no way for the caller to do so. In particular, prior art teleconferencing systems provided no way for one caller to transfer to another caller, teleconference, or facilitator while informing the current facilitator that he has left the conference.

However, the prior art has numerous examples of telephone answering systems that enable a caller to either answer a question or to push a button to select a party and then be transferred to that party. However, such ability has heretofore been lacking in teleconference systems.

Therefore, a facilitator led teleconferencing system that enables a caller to transfer to another teleconference or party would be useful. A facilitator led teleconferencing system in which a caller can transfer to another teleconference or to another party without disturbing the ongoing teleconference would be even more beneficial. A facilitator led teleconferencing system in which a caller can transfer to another teleconference or to another party at the touch of a button and without disturbing the ongoing teleconference would be even more beneficial. Still more beneficial would be a facilitator led teleconferencing system in which a caller can transfer to another teleconference or to another party at the touch of a button, can do such without disturbing the ongoing teleconference, and such that the current facilitator is informed that the caller has transferred out of the conference.

BRIEF SUMMARY OF THE INVENTION

It is an object of the present invention to provide a facilitator led teleconferencing system which allows callers to transfer to a different party, facilitator, or teleconference by pressing a key on their telephone keypad.

It is another object of the present invention to provide a facilitator led teleconferencing system which retrieves and reports contact information about each caller transferring from a facilitator led discussion.

It is a further object of the present invention to provide a facilitator led teleconferencing system that reports identifying or contact information of each caller transferring from a facilitator led discussion wherein the contact information is reported to the party the caller is being transferred to.

The principles of the present invention provide for a facilitator led teleconferencing system that enables teleconferences involving a plurality of callers and at least one facilitator. The facilitator controls the teleconference using application software, possibly via a computer system having a graphical user interface. The application software controls a switch that endows the callers with the ability to automatically transfer their call to a different conference group, facilitator, or other party, by initiating a transfer, such as by touching a particular key on their telephone keypad. The system detects when a caller initiates a transfer and then automatically transfers their call to another party without disruption of the teleconference. The transfer is reported to the current facilitator and to the new facilitator, if any, who is then provided with contact information regarding the transferring-in caller.

To the accomplishment of the above and related objects, the invention may be embodied in the form illustrated in the accompanying drawings. Attention is called to the fact, however, that the drawings are illustrative only. Variations are contemplated as being in accord with the principles of the present invention, therefore the present invention shall be construed as being limited only by the broad scope of the appended claims.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

The presently disclosed subject matter will now be described more fully hereinafter with reference to the accompanying drawings in which one embodiment is shown. However, it should be understood that this invention may take many different forms and thus should not be construed as being limited to the embodiment set forth herein. In the figures, like numbers refer to like elements throughout.

Figure 1:
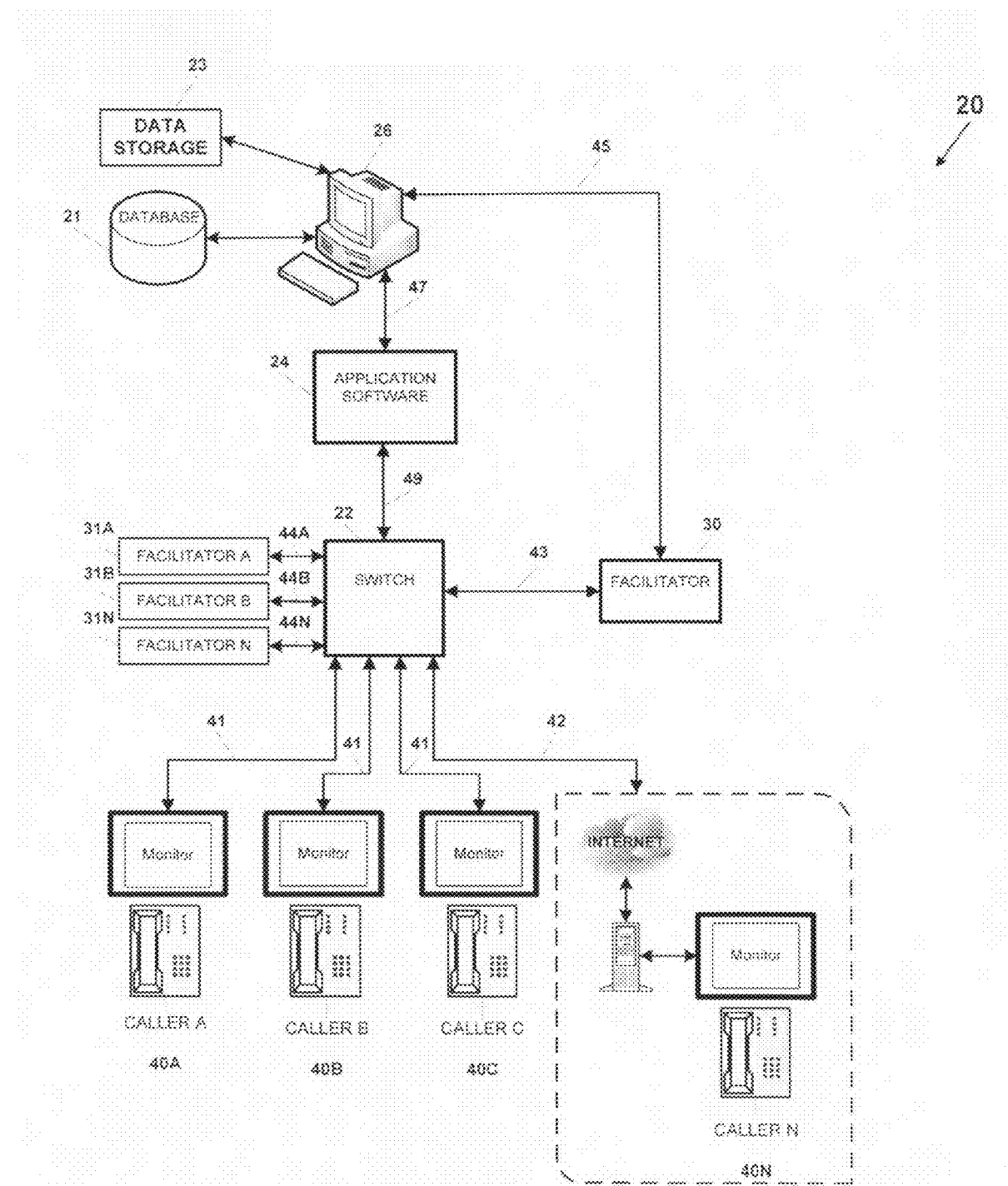
FIG. 1 is a diagrammatic representation of the various stations that comprise an interactive teleconferencing system that is in accord with the principles of the present invention.

FIG. 1 illustrates a teleconferencing system 20 having a conferencing switch 22 which is central to the operation of the teleconferencing system 20. The teleconferencing system 20 enables a first facilitator 30 to cause the switch 22 to selectively accept calls from a plurality of callers, shown as callers 40A, 40B, 40C, and 40N so as to establish a teleconference. That teleconference can take place visually, audibly, via data, or by some combination of visual, audible, and data. But in any event all of the callers 40A, 40B, 40C, and 40N receive information from the first facilitator 30. Two-way communications between the callers 40A, 40B, 40C, and 40N and first facilitator 30 is beneficially possible.

The callers 40A, 40B, 40C, and 40N can call in using an assortment of communication mediums such as telephone lines 41 (as with callers 40A-40C) and internet connections 42 (as with caller 40N). Of course the teleconferencing system 20 is also contemplated as working with more or fewer callers and with other communication mediums, such as microwave or radio communications. The conferencing switch 22 sends voice prompts to the callers 40A, 40B, 40C, and 40N, and accepts data input from those callers, such as via touch-tones, voice, keyboard entry, or other means. If by voice, the teleconferencing system 20 includes voice recognition software.

The conference switch 22 also establishes a communication pathway with the first facilitator 30 via a communication pathway 43. Likewise, the conference switch 22 can establish communication pathways 44A, 44B, and 44N with facilitator 31A, facilitator 31B, and facilitator 31N, respectively. Of course, there may be more or fewer facilitators and pathways. Beneficially the pathways 43, 44A, 44B, and 44N are digital.

The telecommunication system 20 is configured to enable the switch 22 to transfer one or more of the callers (40A, 40B, 40N) to another party, such as facilitator 31A, facilitator 31B, or facilitator 31N, or caller, such as caller 40A, caller 40B, caller 40N, or another party in response to a caller-initiated command, such as pressing a key on their telephone keypad or pressing a keyboard key. That caller-initiated command will have been provided to the callers either before or during the teleconference. Beneficially the switch 22 is configured to enable transferring one or more callers (40A, 40B, 40N) to the same party or facilitator or to a different party or facilitator.

For example, assume that callers 40A, 40B, 40N have joined a teleconference with the first facilitator 30 and that facilitators 31A, 31B, and 31N are conducting their own teleconferences. Then, assume that caller 40A wishes to leave the teleconference led by the first facilitator 30 and to join the teleconference led by facilitator 31B. The caller 40A presses the caller-initiated command, say by pressing number "4" on a keypad. That key press is sensed by the switch 22, which automatically transfers the caller 40A to the teleconference being led by facilitator 31B.

In some embodiments of the present invention the only transfers that the callers 40A, 40B, 40C, and 40N can make are ones specifically authorized by the first facilitator 30. For example, the first facilitator 30 might provide the callers 40A, 40B, 40C, and 40N with a list of ongoing teleconferences being conducted by facilitators 31A, 31B, and 31N, and then provide directions on how to initiate transfer to one of those teleconferences. As another example, the first facilitator 30 might inform that the callers 40A, 40B, 40C, and 40N that at any time during the teleconference they can transfer their call to a technician by pressing "1" or to a sales representative by pressing "2" on their telephone keypad.

Hardware and firmware suitable for implementing the switch 22 are well known in the art. The switch 22 can be a hardware device or it can be a combination of hardware and software. For example, when used under the control of specific application software (discussed subsequently) an open source software solution such as FreeSwitch, distributed at freeswitch.org, can control hardware that is currently available within existing telecommunication networks to provide the required functionality described herein.

Still referring to FIG. 1, it is contemplated that the switch 22 operates under the control of application software 24, which is comprised of code written to enable both basic teleconferencing functions and to provide the specific functionality to implement the principles of the present invention. The application software 24 might run as part of the switch 22, or it might be applied to the switch 22 by way of a data control port 49 and/or a secondary port 47 from a computer system 26. Preferably the application software 24 runs under the control of the computer system 26. The computer system 26 beneficially provides the first facilitator 30 with a user interface that enables, via a manual interface 45, control of the computer system 26, the application software 24, and the switch 22 as required to implement the various features of the teleconferencing system 20.

Preferably, the computer system 26 implements a user interface having a web-based, GUI (Graphic User Interface) display which allows a mouse to control the functions of the teleconferencing system 20. It should be noted that the teleconferencing system 20 generally operates at the behest of the first facilitator 30, which is a person or group that leads the teleconference and controls, by way of the manual interface 45, the computer system 26, the application software 24, and the switch 22.

FIG. 1 shows the teleconferencing system 20 with other facilitators, the facilitators 31A-31N, who operate their own teleconferences. As such those facilitators have their own GUI and manual interfaces 45, which are not shown for clarity. As such, they control the application software 24 and switch 22 as required to control their own teleconferences.

As noted the specific configuration of the switch 22 is controlled by the first facilitator 30. To assist the first facilitator 30, that facilitator has access to a database 21 that can be stored in data storage 23, which will typically be part of the computer system 26. Information in the database can be accessed by the first facilitator 30 as required. For example, the first facilitator 30 might be provided with caller information about each caller in his teleconference which was obtained in registration. When a caller initiates a transfer the first facilitator 30 is informed about that transfer. If the caller initiates a transfer to another facilitator the teleconferencing system 20 informs the new facilitator about the incoming caller. The new facilitator can be provided with information about the incoming caller using data stored in the database 21. Therefore, the telecommunication system 20 is beneficially configured such that all facilitators are kept informed by their GUI of who is in his or her teleconference and is informed when a caller, such as caller 40A has transferred out of this teleconference.

Figure 2:
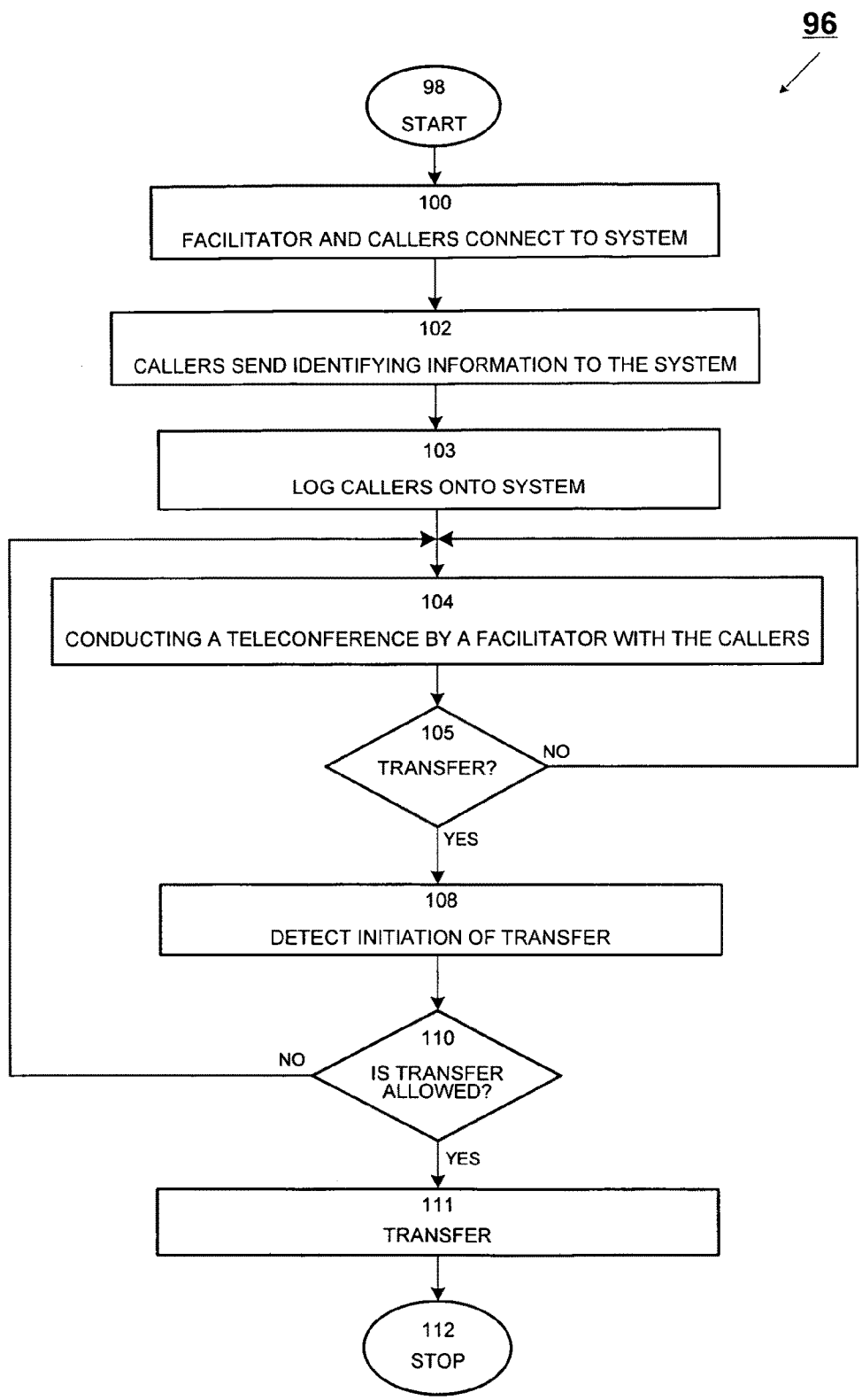
FIG. 2 is a flow chart illustrating the operation of the interactive teleconferencing system illustrated in FIG. 1.

FIG. 2 illustrates the operation 96 of the teleconferencing system 20. The operation 96 starts at step 98 by the first facilitator 30 and the callers (40A, 40B, 40C, 40N) connecting to the teleconferencing system 20, step 100. The callers then send identifying information to the teleconferencing system 20, step 102. The teleconferencing system 20 receives that information and logs the callers into the system, step 103. After step 103 the facilitator 30 conducts a teleconference, step 104. By this time the first facilitator 30 is beneficially automatically provided with caller information from the database 21.

User accounts may have been established prior to step 100 or a user account may be set up at step 102. Typically, the callers will provide PIN numbers, telephone numbers, names, addresses, email addresses, or any other contact information. A primary purpose of logging in callers at step 103 is to establish the identity of the callers that are connected to the switch 22 and to filter out callers who are not permitted in the teleconference. This enables a database record to be accessed for each caller and the first facilitator 30 is informed of who is in his teleconference.

Additionally, by step 104 the teleconferencing system 20 will have established how the callers 40A-40N can transfer out of the teleconference being conducted by the first facilitator 30. This information is also made available to the callers 40A-40N, either before or during the teleconference. Information about how to transfer may be made several times during a teleconference During step 104 each caller decides whether or not to transfer out of the teleconference, step 105. If no caller wants to transfer out the teleconferencing system 20 returns to step 104. However, if a caller, say caller 40A decides to transfer, he initiates the transfer process, such as by pressing a pre-assigned key on his telephone keypad.

The teleconferencing system 20 then detects the initiation of the transfer process, step 108. The teleconferencing system 20 then checks whether the transfer is allowed/authorized, step 110. If not allowed the operation 96 returns to step 104 for continuation of the teleconference. However, if the transfer is authorized the transfer is made, step 111. The operation 96 then stops, step 112.

In conclusion, herein is presented a teleconferencing system which allows a plurality of callers the ability to transfer out of a teleconference to another teleconference, caller, or party, all without disruption of the teleconference. The invention is illustrated by example in the drawing figures, and throughout the written description. It should be understood that numerous variations are possible, while adhering to the inventive concept. Others who are skilled in the applicable arts will recognize numerous modifications and adaptations of the illustrated embodiments that remain within the principles of the present invention. Therefore, the present invention is to be limited only by the appended claims.

What is claimed:

1. A teleconferencing system, comprising;
   a computer system having a user interface;
   a switch that interconnects a plurality of callers and a first facilitator on a communication medium; and
   application software controlling said switch;
   wherein said application software causes said switch to interconnect said plurality of callers and said first facilitator into a teleconference;
   wherein said application software enables said first facilitator to send instructions on how callers can initiate transfer to another party;
   wherein said application software uses said switch to determine if a caller has initiated a transfer to said another party; and
   wherein said application software uses said switch to transfer a caller who has initiated a transfer to said another party;
   wherein said user interface informs said first facilitator that a caller has been transferred;
   wherein said application software causes said computer system to provide data to said first facilitator about a transferred caller; and
   wherein said application software causes said computer system to retrieve information associated with the plurality of callers from a database.

2. A teleconferencing system according to claim 1, wherein said another party is a second facilitator.

3. A teleconferencing system according to claim 1, wherein said another party is not in said teleconference.

4. A teleconferencing system according to claim 1, wherein said application software associates an initiation of a transfer with the initiating caller.

5. A teleconferencing system according to claim 1, wherein a transfer is initiated by pressing a key on a telephone keypad.

6. A teleconferencing system according to claim 1, wherein a transfer is initiated by pressing a key on a computer keyboard.

7. A teleconferencing system according to claim 1, wherein a transfer is initiated by clicking a mouse.

8. A teleconferencing system according to claim 1, wherein said computer system includes a manual interface.

* * * * *